3,042,504
DEWATERING OF AQUEOUS PASTES OR SLURRIES OF THERMAL CARBON BLACK
Frederick Denis Carter, 2 Brooklyn Gardens,
Cheltenham, England
No Drawing. Filed Mar. 25, 1960, Ser. No. 17,496
Claims priority, application Great Britain Sept. 12, 1952
8 Claims. (Cl. 23—314)

This application is a continuation-in-part of my application Serial No. 379,443 filed on September 10, 1953, and now abandoned.

The invention relates to the dewatering of aqueous pastes or slurries of thermal carbon blacks.

Finely particulate solids, though simple in appearance, are in fact complex materials as is evident from their physio-chemical behaviour which can vary so widely with their methods of preparation that superficially identical particulate materials can behave quite differently in practice. Thus thermal blacks and channel blacks have very little in common apart from their high content of elemental carbon and the fact that both types can be termed carbon blacks. Physio-chemically the former, which are hydrophobic, have little in common with the latter or lampblacks, which are hydrophilic.

In the manufacture of thermal carbon blacks the product is obtained suspended in water in the form of aqueous filter cakes, thixotropic slurries or pastes which, due to their fine and/or thixotropic nature, possess a very high proportion of water. Some of the water can be removed by settling and decanting, but the removal of the residual water becomes progressively more difficult as more water is removed. After all the possible water has been removed by mechanical means the pastes or slurries require very considerable heat energy for normal physical drying; they cannot be appreciably dewatered further by pressure and their feeding to driers presents considerable difficulties. Accordingly such pastes form an acute drying problem which at present is only solved by using high cost processes. Thermal black, however, commands only a comparatively low market price and can only be sold at a profit if the cost of dewatering the paste or slurry of the black is less than the market price of the same which means that only a small percentage of water must remain for evaporation by heat if a profit is to be made.

Moreover, drying of such pastes or slurries, for instance on trays, produces a hard shrunken cake for which the contant rate zone of drying is a minimum and frequently the particular advantages of the powder, such as dispersibility and covering power, have been lost, even if the dry product is, as would be necessary, ground.

The present invention has for its main object to provide a method of dewatering aqueous pastes or slurries of thermal carbon black which will be economical in operation and will not deleteriously affect such valuable properties as dispersibility and covering power of the black.

The invention is specifically concerned with the type of process which depends upon the fact that one liquid will displace another from a solid powder if the contact angle in that liquid, made by the liquid/liquid interface with the solid, is acute. In other words, for a second liquid to displace water, its adhesion tension relative to the particular solid must exceed that of water.

A process of said type is described in U.S. Patent No. 1,889,429 issued to Weigand and Venuto, November 29, 1932 (also in a re-issue of the patent, i.e. Re. 22,454 which was re-issued March 7, 1944). The process described in the patent is concerned with increasing the bulk density of carbon black without changing the useful industrial properties thereof. The described process starts with a dry black and is actually concerned with lamp black, gas black, etc. which were the only blacks known at the time of Weigand and Venuto's application, i.e. 1927. Since such blacks are obtained in dry form they do not pose a dewatering problem.

The process described in the patent comprises mixing the carbon black with water and then agitating the mixture and adding gasoline. The carbon forms granules which float on top of the water and are then separated and dried to remove the gasoline and residual moisture. In describing the various stages of their process, the patentees state that the end point is reached when the granules float to the top and the water below is carbon-clear.

The patent also teaches that organic residues cause harshness in the granules; that if too much gasoline is used the granules will compact to hard pellets; and that if too much water and not enough gasoline is used an inferior product will result. As a guide to be taken in conjunction with the above the patent gives the following proportions by weight:

Carbon_____ 5.
Water_____ 40–80 (12.5–6.25% solids).
Gasoline_____ 7–9 (140–180% on weight of carbon).

Moreover mixing for 5 minutes is suggested which will bring the granules to the surface and will be the end point of the process. The patentees also refer to the obvious fact that if, instead of gasoline, a liquid such as carbon tetrachloride is used, the granules will sink due to the high specific gravity of the carbon tetrachloride.

Application of the process described by Wiegand and Venuto to aqueous pastes and slurries of thermal blacks did not provide significant dewatering. This was because, if one carries out the process with gasoline, the patent teaches that the process should be stopped when the granules float to the surface which is after about 5 minutes agitation of the carbon-water-gasoline mixture. Moreover, the agitation is to be carried out, according to the patent, by shaking, rotating or tumbling of the container or by means which will impart rapid changes in the direction of flow to the liquid as, for instance, apertured obstructions and baffles in a conduit.

I have found, surprisingly, that a process of the general type described in Patent No. 1,889,429 may successfully be used to dewater aqueous slurries of thermal blacks if substantial and significant departures are made from the procedures laid down in the patent. I have found that the following three conditions must be satisfied, i.e.:

(1) The agitation of the water-carbon-gasoline mixture must be carried out with violent shearing action in some sort of bladed mixing machine such as a high-speed propeller-type agitator. I believe that the success of this type of stirring is due to the fact that the high peripheral speed of the propeller blades causes the mixture to be subjected to a violent shearing action which sets up shock waves therein. These shock waves act on the granules of carbon which are formed to cause extremely deep penetration of the gasoline or similar liquid into the pores and interstices of the black thus displacing a great deal of the gas and water therefrom. The natural adhesion tension forces are not, per se, sufficient to displace such a considerable proportion of the gas and water. A great deal of work has to be done on the mixture to achieve this displacement and this requires a high power input to the stirring and the continuance thereof for an appreciable time as described in (2) below. Degasification and dewatering are concomitant although degasification must preced dewatering. The process described by Wiegand and Venuto does not suggest that a violent shearing action will serve to displace the gas and water and the processes described by the patentees for agitating the mixture are insufficient to set up the shock waves necessary for the carrying out of the present invention.

(2) The agitation of the water-carbon-gasoline mixture must be carried on for a relatively substantial period after the granules have been formed as this permits the further degasification and dewatering of the granules described in (1). When using a solvent of specific gravity of less than 1, an indication that substantial degasification and dewatering has occurred is when the granules sink. This is directly contrary to the teaching of Wiegand and Venuto who point out that their process ends when the granules float if a second liquid of specific gravity of less than 1 is used. I have found that the time required for stirring must be at least 15 minutes starting from the commencement of the addition of the second liquid and that this is independent of the actual liquid added to the carbon-water mixture so long as it is of the type which lies within the general scope of the process. Weigand suggests only 5 minutes agitation and such a time, even with my more efficient form of agitation, will not produce commercially acceptable dewatering of thermal blacks as will be seen by reference to Table 2 below where it is shown that, after such a stir time, 100 gms. of carbon (if drained at this stage) will still contain 133 gms. of water and to have to remove this water by heat would boost the cost of the black beyond economic limits. As will be explained hereinafter, 15 minutes represents a point on the stir time-residual water graph at which the latter has flattened out and is therefore a critical point for the practical success of the process.

(3) The gasoline or other liquid must be added in a proportion which Wiegand and Venuto teach will give an inferior product since there would, for their process, be too much water and not enough gasoline. Specifically I have found that the proportion of gasoline or other liquid must be between 30 and 130% based on the dry weight of the carbon. If the proportion of the liquid used lies outside these limits then the efficiency of the process suffers.

The violent shearing action required in the process of the invention is readily obtainable by the use of a high speed propeller-type agitator, which is preferably mounted off-centre to prevent vortexing and sloped to provide mixing equivalent to baffled conditions. Other types of agitator may be preferable under particular circumstances at the plant and their selection will present no problem to those skilled in the art once the principle involved has been appreciated.

The critical effect of the amount of second liquid used and of the time for the action to be completed is best illustrated by examples, which show the unexpected nature of the effects. The industrial carbon black paste used arose from washing the gases from an oil-gas generator. The carbon black in the paste had an average particle diameter of 268 millimicrons and 2.9% of inherent solid polycyclic hydrocarbons. The fresh industrial paste contained much absorbed and occluded gas and therefore floated on the water, it was scraped off and allowed to drain. The drained paste possessed 70% of water and was an acute disposal problem since it was uneconomic to dry such material by known methods.

333 grammes of the drained paste containing 100 grammes of carbon was diluted with 1434 ccs. of water to form a suspension containing 6% of solids. The mixture was violently stirred with an offset and sloped high speed propeller stirrer to obtain the maximum degree of agitation without vortexing. Various amounts of toluene were added in a series of experiments, the addition occupied 5 minutes and the subsequent stir time was fixed at 15 minutes, at which stage the suspension was filtered by gravity and the residual water remaining with the carbon was measured. The results are shown in the following table:

TABLE 1

*Second Liquid Usage Per 100 Gms. of Carbon*

| Toluene: | Residual water |
|---|---|
| Nil | 233 gms. (30% C. drained paste). |
| 20 gms | 200 gms. |
| 30 gms | 183 gms. |
| 40 gms | 150 gms. |
| 50 gms | 44 gms. |
| 65 gms | 25 gms. |
| 120 gms | 58 gms. |

The results show a critical drop to an optimum position followed by a deterioration if too much toluene is used.

Using the optimum amount of toluene as shown by the above series of experiments, that is using 48.5 grammes of toluene per 100 grammes of the same carbon, the dilution to 6% solids and the special stirring mentioned, the critical nature of the time of stirring was illustrated in a further series of experiments.

TABLE 2

*Residual Water Against Stir Time*

| Stir time: | Residual water, gms. |
|---|---|
| Nil | 235 |
| 5 mins | 133 |
| 10 mins | 47 |
| 15 mins | 25 |
| 20 mins | 18 |

It is clear from the foregoing figures that from the initiation of the stirring the residual water first decreases sharply and then more slowly. If the figures be represented graphically it will be found that there is initially a steep portion of the graph which flattens out and commences to reach an asymptotic value at a stir time of approximately 15 minutes. It is apparent, therefore, that to make full use of the benefits of the present invention the mixture must be stirred for at least 15 minutes. This can be demonstrated by a further graph in which the ratio of the difference between each two successive values of residual water to the residual water at the later of said two values is plotted against stir time. This graph has a peak at a stir time of approximately 10 minutes and, in order to ensure that the peak is passed and that the process is being worked on the reverse slope of the curve, it is necessary to stir for at least 15 minutes. From both these considerations it will be appreciated that the stir time of 15 minutes is critical to the success of the invention. Moreover, I have found that the stir time is independent of the type of second liquid which is used so long as the latter is volatile, substantially immiscible with water and has a higher adhesion tension for the carbon than the water.

The dilution of the industrial paste to under 12% solids, preferably about 6%, is necessary to produce the minimum fluid viscosity so that the stirrer can apply the maximum shearing action on the suspended particles. The effect of this dilution may be seen from a third series of experiments, summarised in Table 3 for which stir time, stirrer type, amount of carbon and amount of toluene were fixed and the amount of dilution water was varied. The carbon itself was not the same as was used for the two above series.

TABLE 3

| Solids content, percent: | Residual water per 100 gms. carbon, grammes |
|---|---|
| 17 | 113 |
| 13 | 100 |
| 12 | 73 |
| 10.5 | 45 |
| 10 | 35.5 |
| 9 | 32.5 |
| 8 | 32.5 |

Table 3 shows that the addition of water to the normal filter cake is an unforeseeably advantageous preliminary to this drying process.

Preferably the aforesaid violent shearing action is effected by the use of high-speed propeller-type stirring apparatus. The maximum concentration of solids is preferably fixed for each individual case, but, generally speaking, the treated paste or slurry should have a maximum solids concentration not exceeding 12%. This preliminary preparation (when necessary) of the slurry to give the aforesaid dispersion of predetermined low solids concentration is an essential feature of the invention, allowing simultaneously maximum dewatering, adequate fluid medium and correct granule size for subsequent processing. It will be understood that, apart from the water and the second liquid both being non-solvents for the solid, they are substantially immiscible. The second liquid, possessing the greater wetting power for the solid, forms with the latter wet granules comprising substantially all the solid and the second liquid and these wet granules may be separated from the water with or without mechanical aid. The water draining off is substantially free from the second liquid and comprises both the added water and the majority of the water originally present in the paste or slurry.

After the addition of the particular amount of the second liquid and intimate admixture as already described, the solid phase is preferably substantially freed from water simply by draining or filtration. Any liquid may be employed as the aforesaid second liquid provided it is immiscible with water, volatile, a non-solvent for the solid and possesses a higher adhesion tension for the solid. For thermal black toluene has been found to comply ideally with the requirements. However, benzene homologues, solvent naphthas, straight chain hydrocarbons, naphthenes, tetrachlor methane, chloro-ethylenes or natural or artificial mixtures of the same are also suitable.

Advantageously, in accordance with a further feature of the invention, the second liquid is recovered and recycled in a continuous application of the dewatering process.

By means of the invention the separation of the bulk of the inherent water from the paste or slurry may be effected without the application of heat or significant mechanical energy. The process, which may be termed "chemical dewatering," is therefore extremely economic in operation. It will be appreciated that because of the low market price of the product, its low thermal conductivity and its inflammability, any substantial reduction in its water content obtained without the action of heat is of fundamental significance in the trade. Moreover, the formation of the powder into granules leaves the solid with an advantageous surface form for rapid final drying. Incidentally, the preliminary dilution stage of the process readily allows the removal of grit fortuitously present in the original paste or slurry. Furthermore, the rubber compounding properties of the black are improved in that the dewatering process of the invention causes a beneficial redistribution of the benzene-soluble organic chemicals originally present in the black and/or causes a realignment of the carbon chains.

Finally the rigidity of the product granules may be improved by inherent benzene-soluble chemicals. For example, many carbon blacks do not possess an inherent benzene-soluble content and the economic drying of their very high moisture content slurries, produced industrially during the final washing of the carrier gases, has not been deemed practical. However, such carbons can be purposely produced, at higher yield, with an inherent organic contamination to allow of the application of the process.

In practice, most industrial thermal black pastes or slurries are slightly acidic due to the presence of sulphur gases. However, this slight acidity is an advantage since the hydrophobicity of the carbon is enhanced and moreover subsequent compoundings in rubber exhibit less tendency to "scorch." In cases where the carbon paste or slurry is not slightly acidic a simple adjustment to this end is preferably made.

By way of example, the practical application of the dewatering process will now be described to carbon black paste obtained as a by-product, during the manufacture of carbon blacks of the furnace and thermal types, in the form of slurry or paste resulting from the clearing of carbon from the carrier gases by passing the latter through a water scrubber or washbox. Such carbon pastes often possess up to 80% of water, i.e. 100 parts of carbon are associated with 400 parts of water, and commonly have a pH of 5–6 despite the inherent neutral or alkaline properties of the blacks themselves. If necessary, however, the acidity of the paste is adjusted to this value, as already mentioned. In accordance with the invention the industrial carbon paste or slurry is diluted with water until it has a solids concentration of 12% or less and stirred with the aid of a high-speed propeller-type stirrer. After thoroughly mixing, the required amount of toluene (as given by way of example hereinafter) is run in and the batch stirred vigorously for between 15 to 20 minutes, during which the carbon forms itself into granules. These granules, which float during the first 5 to 10 minutes of the foregoing time, sink by the end of the 15 minutes and can be readily separated from the clear water by filtration, draining, decanting or the like. The drained carbon granules contain substantially all the added toluene but very little water, so that the majority of the water in the original paste or slurry, and the added water, has been separated by the process. To complete the dewatering process the drained granules are dried preferably in an enclosed system to enable the toluene to be recovered and reused.

The control of the process to obtain optimum dewatering is strict since an excess of toluene reduces the effect. The optimum amount of toluene required varies with the specific surface area of the solid and with the presence of adsorbed gases or organic benzene-soluble matter inherently present. Moreover stirring time, type of stirring apparatus, shape of the container, solids concentration and temperature all affect the result of the operation, and the process is operated having regard to these factors, in relation to the particular solid phase and the particular second liquid, in a plant comprising enclosed units particularly adapted and arranged to utilise the benefits of the invention. For example, the vigorous stirring must not be continued indefinitely beyond the period specified above as, if it is, the granules eventually adhere and become large plastic balls. At this stage the degree of chemical dewatering has passed its maximum and is deteriorating.

As an example of the relative proportions which have been found suitable by experiment in the foregoing specific example of the process, the following are given:

| | Parts by weight |
|---|---|
| Carbon in paste | 10 |
| Water in paste | 20 |
| Added water | 80 |
| Toluene | 3 to 13 |

With reference to the range of toluene addition specified above, three parts by weight of toluene are required in the above example for a carbon black of mean particle diameter 400 millimicrons and thirteen parts for one of 32 millimicrons mean particle diameter. It will be observed that the effect of adding the 80 parts of water is to adjust the solids concentration from 33% to 9%.

If the amount of toluene is increased to from 14 to 18 parts my beneficial results are not obtained under any conditions of stirring. While such an amount can be employed in pelletisation processes where the object is to produce pellets and a minor amount of dewatering is incidental, the use of such a large amount of toluene under my conditions of agitation yields a sticky emulsion as the product.

As an indication of the practical and economic benefits of the process according to the invention an actual industrial thermal black paste or slurry will now be briefly considered. This paste or slurry possesses 67% of moisture, i.e. 100 grams of carbon are wetted by 220 grams of water, and accordingly, considering the latent heat of evaporation only, 1190 gm. cals. would be required to evaporate the liquid associated with 1 gram of carbon. After submission to the process of the invention, 100 grams of carbon are, in the foregoing example, wetted by 32 grams of toluene and 22 grams of water. Accordingly, on the same basis, only 146 gm. cals. are required to evaporate the liquids now associated with 1 gram of carbon, i.e. a saving in heat energy of 87%. Further benefits of the process can be seen to be the much lower latent heat of evaporation of the second liquid than that of water and the fact that a part of the retained water distils off with the second liquid at a temperature below the boiling point of either. Even assuming that the paste or slurry of the foregoing example can be partially dewatered by the application of very high pressures to a 40% moisture product, dewatering of this product by the process of the invention would represent a 60% heat energy saving against complete drying by heat, this being calculated on the basis of latent heats only. In actual fact, the benefits conferred by the invention are only partially represented by the heat energy figures given, these taking no note of the preferential physical drying form of the carbon granule dewatered by the process of the invention.

I claim:

1. A process for dewatering an aqueous suspension of thermal carbon black having a solids concentration of up to 12% by weight comprising the steps of adding an amount of between 30 and 130% by weight of the carbon black of a second liquid which is volatile, substantially immiscible with water and which possesses a higher adhesion tension than water for the carbon black, simultaneously with said addition subjecting the mixture to violent searing action by high-speed agitation to form wet granules of carbon and continuing the agitation for a substantial period after the formation of the granules so that the total time of agitation is at least 15 minutes, separating the granules from the residual liquid of the mixture by draining and then drying the granules to evaporate liquid contained therein.

2. A process for dewatering an aqueous paste of a thermal carbon black comprising the steps of adding water to the paste to form a suspension having a solids concentration of up to 12% by weight, adding an amount of between 30 and 130% by weight of the carbon black of a second liquid which is volatile, substantially immiscible with water and which possesses a higher adhesion tension than water for the carbon black, simultaneously with said addition subjecting the mixture to violent shearing action by high-speed agitation to form wet granules of carbon and continuing the agitation for a substantial period after the formation of the granules so that the total time of agitation is at least 15 minutes, separating the granules from the residual liquid of the mixture by draining and then drying the granules to evaporate liquid contained therein.

3. A process for dewatering an aqueous paste of thermal carbon black comprising the steps of adding water to the paste to form a suspension having a solids concentration of up to 12% by weight, adding an amount of between 30 and 130% by weight of the carbon black of a second liquid which is volatile, substantially immiscible with water and which possesses a higher adhesion tension than water for the carbon black, simultaneously with said addition subjecting the mixture to violent shearing action in a high-speed propeller-type agitator to form wet granules of carbon and continuing the agitation for a substantial period after the formation of the granules so that the total time of agitation is at least 15 minutes, separating the granules from the residual liquid of the mixture by draining and then drying the granules to evaporate liquid contained therein.

4. A process for dewatering an aqueous paste of thermal carbon black comprising the steps of adding water to the paste to form a suspension having a solids concentration of up to 12% by weight, adding an amount of between 30 and 130% by weight of the carbon black of toluene, simultaneously with said addition subjecting the mixture to violent shearing action in a high-speed propeller-type agitator to form wet granules of carbon and continuing the agitation for a substantial period after the formation of the granules so that the total time of agitation is at least 15 minutes, separating the granules from the residual liquid of the mixture by draining and then drying the granules to evaporate liquid contained therein.

5. A process for dewatering an aqueous paste of thermal carbon black comprising the steps of adding water to the paste while the latter is contained in a high-speed propeller-type agitator to form a suspension having a solids concentration of up to 12% by weight, agitating the mixture to ensure that the suspension is uniform, adding an amount of between 30 and 130% by weight of the carbon black of a second liquid which is volatile, substantially immiscible with water and which possesses a higher adhesion tension than water for the carbon black, continuing agitation during the addition of said second liquid so that the resulting mixture is subjected to violent shearing action by the agitator to form wet granules of carbon and continuing the agitation for a substantial period after the formation of the granules so that the total time of agitation from the commencement of the addition of the second liquid is at least 15 minutes, separating the granules from the residual liquid of said resulting mixture by draining and then drying the granules to evaporate liquid contained therein.

6. A process for dewatering an aqueous paste of thermal carbon black comprising the steps of adding water to the paste while the latter is contained in a high-speed propeller-type agitator to form a suspension having a solids concentration of up to 12% by weight, agitating the mixture to ensure that the suspension is uniform, adding an amount of between 30 and 130% by weight of the carbon black of toluene, continuing agitation during the addition of said toluene so that the resulting mixture is subjected to violent shearing action by the agitator to form wet granules of carbon and continuing the agitation for a substantial period after the formation of the granules so that the total time of agitation from the commencement of the addition of the toluene is at least 15 minutes, separating the granules from the residual liquid of said resulting mixture by draining and then drying the granules to evaporate liquid contained therein.

7. A process for dewatering an aqueous paste of thermal carbon black containing benzene-soluble organic impurities and obtained by the cleaning of the carbon from a carried gas by aqueous liquid scrubbing, comprising the steps of adding water to the paste while the latter is contained in a high-speed propeller-type agitator, the water being added to form a suspension having a solids concentration of up to 12% by weight and the mixture being agitated to provide a uniform suspension, adding an amount of between 30 and 130% by weight of the carbon black of toluene, continuing stirring during the addition of the toluene and subjecting the resulting mixture to violent shearing action by the agitator to form wet granules of carbon, the violent shearing action being continued for a total time of at least 15 minutes after the commencement of the addition of the toluene, separating the granules from the residual liquid of the resulting mixture by draining and then drying the granules to evaporate liquid contained therein.

8. The process of claim 3 in which the second liquid is a member of the group consisting of benzene homologues, solvent naphthas, straight chain hydrocarbons, naphthenes, tetrachlor methane, chloro-ethylenes and natural and artificial mixtures thereof.

References Cited in the file of this patent
UNITED STATES PATENTS

| | | |
|---|---|---|
| 1,889,429 | Wiegand et al. | Nov. 29, 1932 |
| 2,665,980 | Carkeek | Jan. 12, 1954 |
| 2,867,508 | Wood et al. | Jan. 6, 1959 |
| 2,903,423 | Mondria et al. | Sept. 8, 1959 |